Oct. 27, 1942.   W. C. TOMKINS   2,300,025
VALVES AND COMBUSTION CHAMBERS OF FOUR-STROKE
INTERNAL COMBUSTION ENGINES
Filed Nov. 27, 1941   3 Sheets-Sheet 1

INVENTOR
WILLIAM C. TOMKINS
By Wilhelm Hercroff Attys

INVENTOR
WILLIAM C. TOMKINS

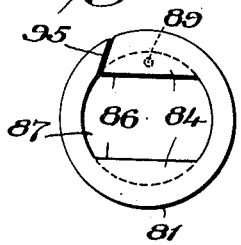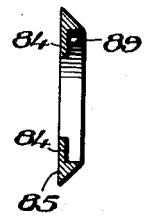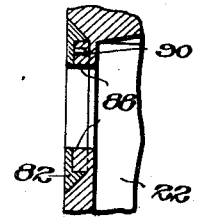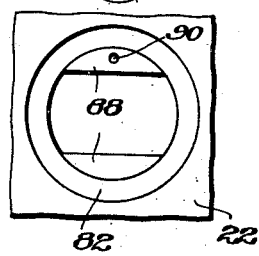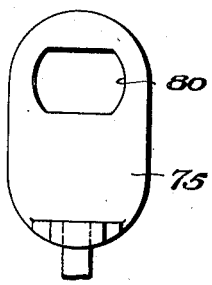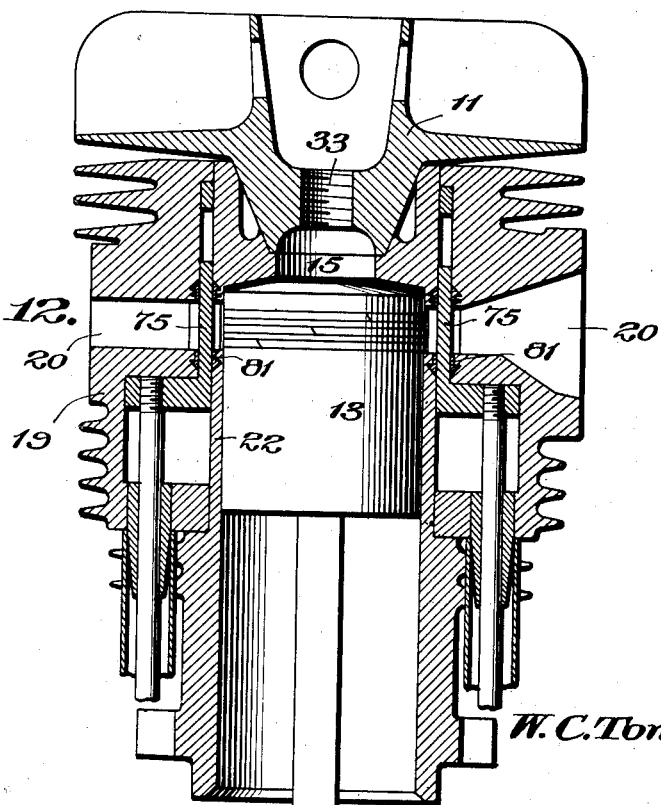

Patented Oct. 27, 1942

2,300,025

UNITED STATES PATENT OFFICE 2,300,025

VALVE AND COMBUSTION CHAMBER OF FOUR-STROKE INTERNAL COMBUSTION ENGINES

William Charles Tomkins, Portslade-by-Sea, England

Application November 27, 1941, Serial No. 420,719
In Great Britain September 4, 1940

2 Claims. (Cl. 123—188)

This invention relates to valves and combustion chambers of four-stroke internal combustion engines.

A primary aim of the invention is to provide a four-stroke internal combustion engine with valves having a novel form and disposition to permit of the combustion chamber having a shape such as will ensure very efficient and economical operation of the engine, the valve design and arrangement being also such as to ensure reliability, quiet and smooth running while at the same time ensuring gas-tight sealing at the valves over prolonged periods of use, a minimum of impedance to gas flow, cool working conditions, and other advantages over ordinary poppet valve and other known valve arrangements.

According to the invention a four-stroke internal combustion engine has valve portways opening into the cylinder near the head thereof, so as to be closed or substantially closed by the piston when same nears the inner end of its stroke, each of said portways being provided with a sliding valve arranged to pass across it, and there are provided in conjunction with each valve a pair of sealing washers. Said washers have inclined faces which seat into the correspondingly inclined bases of recesses provided in the portway on the respective sides of the valve. Said washers are each of a springy nature and transversely split, the spring force tending to increase the diameter of the washer, and the arrangement of the inclined faces is such that by the co-operation of the faces of the washer and recess in conjunction with the spring force of the washer, the washer is urged to maintain surface contact with the valve. Preferably the washers are wedge-shaped in section and the recesses are of corresponding wedge shape, the said sectional form of a washer providing a flat surface thereon for contact with the valve.

This invention is particularly applicable to a four-stroke internal combustion engine having a cylinder head and/or piston head so formed as to provide an annular margin along which the piston substantially meets the cylinder head when the piston is at the inner end of its stroke, said margin encompassing a combustion chamber, an inlet and an exhaust portway each opening into the cylinder wall at such a position that communication between each portway and the combustion chamber is substantially cut off by the piston reaching the inner end of its stroke, and a valve for controlling a duct associated with each portway, said valve being adapted at one position to substantially close the cylinder portway and to close the duct while the piston substantially cuts off communication between the portway and combustion chamber. This arrangement provides a combustion chamber of such a shape and size as to result in a more complete combustion of the charge and substantially instantaneous flame propagation and allow of a high compression ratio being obtained without deleterious effects due to over-heating of the valves, since the valves are substantially isolated from the combustion flame.

According to a further feature of the invention therefore there is provided a four-stroke internal combustion engine having a cylinder head and/or piston head so formed as to provide an annular margin along which the piston substantially meets the cylinder head when the piston is at the inner end of its stroke, said margin encompassing a combustion chamber which preferably is of part spherical shape, an inlet and exhaust portway each opening into the cylinder barrel at such a position as to be covered by the piston when same reaches the inner end of its stroke, sliding valves arranged to pass across the inlet and exhaust portways respectively, a pair of sealing washers for each valve, and recesses therefor, constructed and arranged as hereinbefore set forth, the construction being such that the sliding valves are isolated or substantially isolated from the combustion flame in the combustion chamber by reason of (a) the piston covering the portways and (b) the piston substantially meeting the cylinder along the annular margin aforesaid. Preferably, there are provided a pair of casing members clamped to the cylinder barrel and having formed therein sections of the inlet and exhaust portways respectively, said casing members being formed to provide working passages for the sliding inlet and exhaust valves.

The sliding valves preferably are cam-actuated.

In the accompanying drawings which illustrate an engine of preferred construction in accordance with the invention, Figure 1 is a vertical section through the engine, Figure 2 is a cross-section on line x—x in Figure 1, Figure 3 is a plan of Figure 1, Figures 4 and 5 are external and internal face views respectively of casing members in which sections of the inlet and exhaust ducts are formed, and Figure 6 is a diagrammatic view showing the operating mechanism for each sliding valve.

Figures 7 and 8 are an elevation and section of a sealing washer constructed according to a modification, and Figures 9 and 10 are a fragmentary section and elevation of the cylinder wall constructed for use with such modified sealing washer of Figures 7 and 8.

Figure 11 is a fragmentary face view of the modified form of valve used with the modification of Figures 7–10.

Figure 12 is a sectional view of the assembled engine similar to Figure 1, showing the modifications therein corresponding to the modified sealing washers and other structures of the modified form of Figures 7–10.

Figure 1:
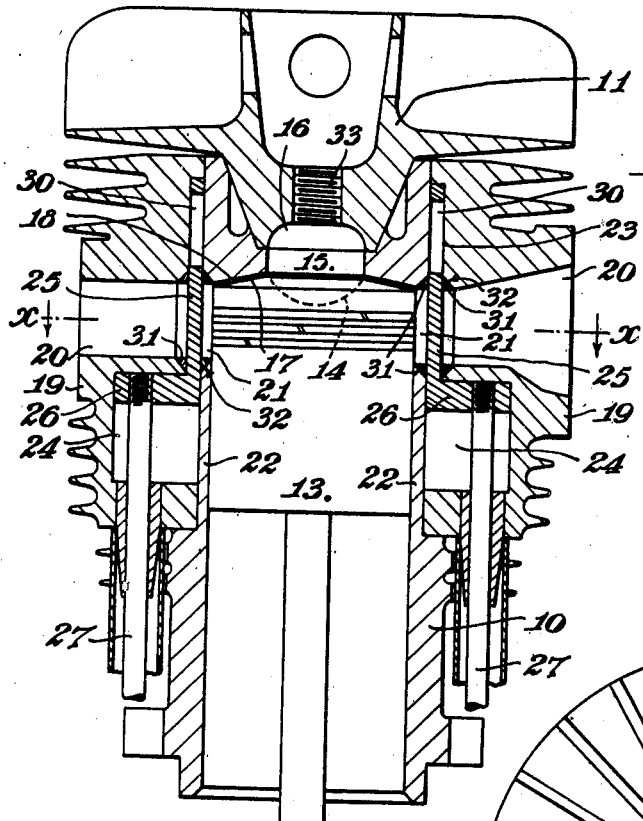
Figure 3:
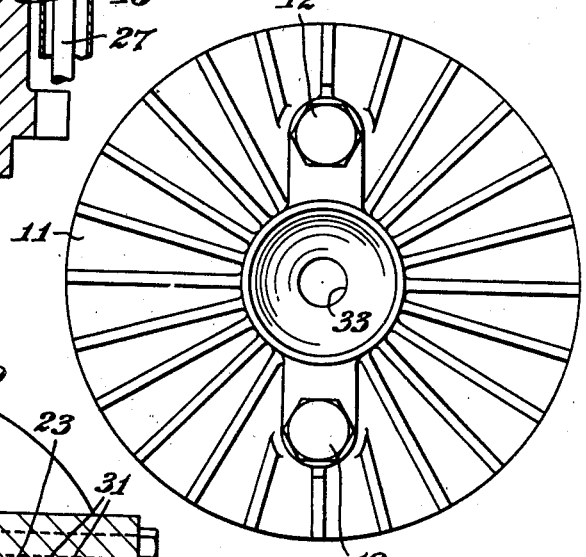
Figure 2:
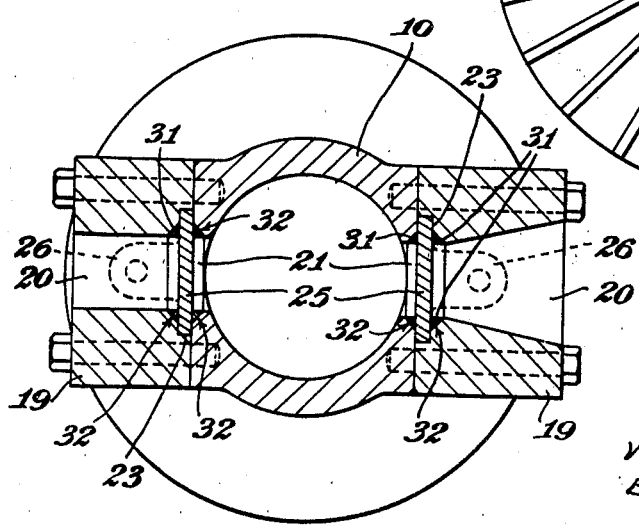
Figure 4:
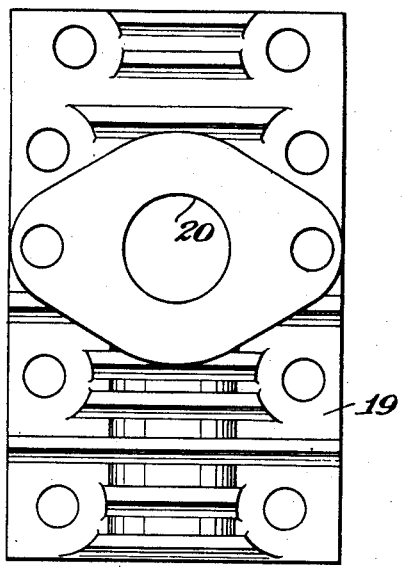

Referring to the drawings, the engine comprises a finned cylinder block 10 provided with a finned detachable head 11 secured by conventional means such as studs 12. Working within the cylinder bore is a piston 13, the head of which is formed with a part-spherical recess 14. An opening 15 is formed in a flanged upper portion of the cylinder barrel, and in a boss-like portion of the detachable head 11 which protrudes downwardly into a cylindrical upper extension of the cylinder barrel there is formed a dome-shaped recess 16. The recess 14, opening 15, and recess 16 together form a combustion chamber.

The stroke of the piston 13 is such that in the top dead-center position thereof a small mechanical clearance exists between a chamfered portion 17 of the piston head and a correspondingly inclined underface 18 of the cylinder barrel flange.

Attached to opposite sides of the cylinder barrel are casing members 19 provided externally with cooling fins, and in each of said casing members there is formed a bore 20. Portways 21 formed in a wall portion 22 of the cylinder barrel are aligned with the respective bores 20, each portway thus forming a continuation of the associated bore to form in one case an intake duct and in the other case an exhaust duct. Said ducts are disposed in diametrically opposite relation. As shown, the under face 18 of the cylinder barrel flange terminates at the upper edge of each portway 21 respectively.

Figure 6:
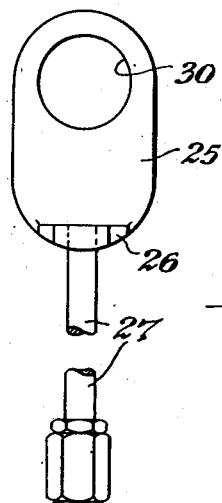
Figure 6:
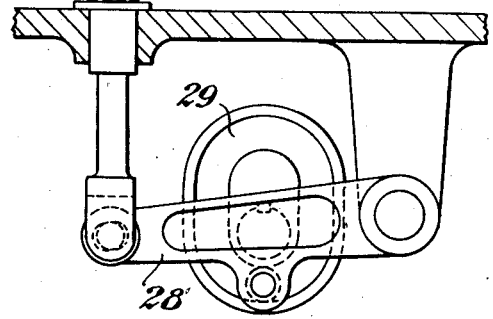
Figure 5:
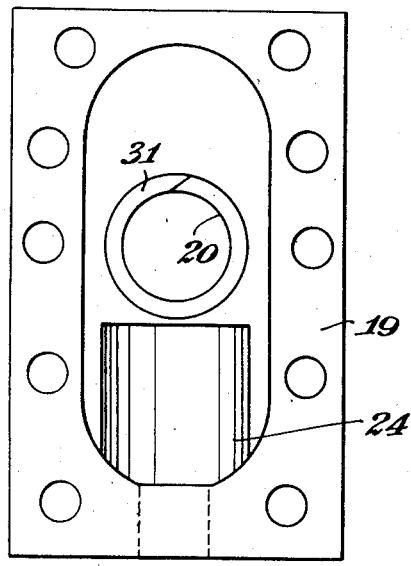

In each casing member 19 there is formed an elongated recess 23 and at the bottom of said casing member there is formed a cavity 24. When the said casing member 19 is clamped to the cylinder barrel a vertical pasageway is formed between the base of the recess 23 and the wall portion 22 of the cylinder barrel. In the said passageway slidably operates a valve 25 of plate-like form, said valve having an angularly extending foot 26, the valve with its foot portion being an L-shaped member as shown. The cavity 24 accommodates the valve foot 26 during the operation of the valve. Attached to the valve foot 26 is a push rod 27 (Figure 6) which at its remote end is coupled to a rocker 28 actuated by a cam 29 provided on a shaft driven at one-half crankshaft speed.

In each valve 25 is formed a port 30, and when the valve is in its uppermost position the said port is above the level of the associated portway 21. When the valve is brought to its lowermost position, however, the port 30 registers with the portway and opens the associated duct.

A pair of annular sealing washers 31 are fitted in each duct, said washers 31 being disposed on opposite sides of the associated sliding valve 25. Said washers are wedge-shaped in section, and seat into corresponding wedge-shaped recesses 32 in the cylinder barrel wall 22 and casing member 19 respectively, the wedge section, which preferably is a triangular one, providing each washer wtih one face having flat surface contact with the valve 25, an inner periphery forming a component of the duct, and an inclined outer face bedding against the inclined base of the associated recess formed in the cylinder barrel or casing member as the case may be.

Each of the washers 31 is of split form, i. e. transversely cut and of a springy nature, the spring force tending to increase the diameter of the washer. This, in conjunction with the inclined outer face of the washer and co-acting bedding face in the cylinder barrel or casing member recess 23 as the case may be, urges the ring to ride towards the sliding valve 25 and bear thereon to form a fluid-tight joint. The said washers 31 are ground into the recesses 23 to which they pertain.

With the above arrangement of a pair of washers any lateral pressure exerted on the sliding valve 25 due to gas pressure within the cylinder and which is such as to slightly displace the valve, will cause the valve to bed the more firmly on to the outer washer and effect more secure sealing during combustion, and at the same time the inner washer in exerting itself will take up the play. Further, the tendency of the washers to bear on the valve due to the spring force and co-operation of the inclined faces, will result in wear being automatically taken up so that the washers function as efficient obturator devices at all times.

A spark plug hole 33 is formed in the cylinder head boss, and the valve-controlled portways 21 are arranged with their boundaries coincident with the sloping underface 18 of the cylinder barrel flange. The casing members 19 fit into recesses form on the outside of the cylinder barrel. The timing of the valves corresponds with the conventional timing of those of a four-stroke engine.

The substantially spherical shape of the combustion chamber insures rapid and complete combustion, ignition being arranged to take place a few degrees before top dead center. By reason of the small mechanical clearance between the surfaces 17 and 18 of the piston head and cylinder barrel flange respectively when the piston is at the top of its stroke, and by reason of the fact that the piston covers the portways 21 at the same time, the sliding valves 25 are substantially isolated from the combustion flame at such position of the piston.

Many further advantages result from the design of engine shown in the drawings, among which may be mentioned promotion of turbulence of the combustible mixture and high efficiency resulting from rapid combustion, i. e. increased rate of flame propagation, a high compression ratio, and efficient scavenging, and minimisation of the period during which the spark plug and other elements are subjected to flame. Further the complete combustion of the mixture in the small combustion chamber results in the power stroke being a pure expansion stroke.

Still further advantages which obtain from the invention are that the valves are self-cleaning, and are kept lubricated by their continual contact with the washers. Also by such contact and by reason of being substantially isolated from the combustion chamber at the moment of combustion said valves are kept reasonably cool, and will operate for long periods without attention.

In a modification of the construction described, which is shown in Figures 7–12, each of the sealing washers 81 is formed with a pair of cheeks 84 within the space bounded by the wedge-section annulus, said cheeks 84 being contained within the flat plane of the washer but being appreciably thinner than the base of the wedge section and each having one face 85 formed as a continuation of the valve-contacting face of said washer, said cheeks 84 being at opposite positions and having their inner boundaries 86 extending chord-wise of the annulus and parallel to one another so as to define a substantially rectangular opening 87, but which has curved ends. The cylinder wall 22 is extended within the space bounded by the wedge-section recess to provide bearing portions 88 which constitute side bearing faces for the washer cheeks 84, one of the washer cheeks having a locating pin 89 engaging into a hole 90 formed in one of said cylinder-wall bearing portions 88. The same formation is applied to the casing member 19. Pin 89 serves to prevent rotational displacement of washer 81. The sliding valve 75 has here its port 80 shaped to correspond with the approximately rectangular washer opening 87.

By thus making the cheek portions 84 of the ring appreciably thinner than the overall thickness of the washer it is possible to provide a rectangular port without making the washer unduly heavy. Also by thus providing for the accommodation of the cylinder wall bearing portions 88, convenient, interlocking provision can be made by pin 89 on the washer and hole 90 in the cylinder wall bearing portion for preventing the rotational displacement of the washer.

The straight top and bottom edges of the rectangular opening 87, and corresponding valve opening 80, have the advantage that they provide for rapid opening and cut-off of the port as compared with a circular opening passing over a circular port. Moreover, a substantially rectangular port provides an opening of greater area for a given extent of valve movement. My washer will approximately maintain its original shape (i. e. a circle) as it expands, and keep in contact around its entire periphery with the cylinder wall, while at the same time providing a rectangular opening. While the cheeks 86 diminish flexibility in the top and bottom regions, still sufficient resiliency is afforded by the remaining circular portions and by having the split arranged where shown at 95 in Figure 7.

I claim:

1. A four-stroke internal combustion engine comprising a cylinder, a piston adapted to reciprocate therein, valve portways opening into the wall of the cylinder, sliding valves operating in passages provided in the cylinder walls, said valves being individual to the portways and each being arranged to pass across the associated portway, each of said portways being provided with a pair of recesses provided on the respective sides of the associated valve, each of said recesses having an inclined base, a pair of springy and transversely split sealing washers adapted to fit into the respective recesses and each of said washers having an inclined face adapted to bed on the inclined base of the associated recess, each of said sealing washers being provided with a pair of opposite segmental flat cheeks thinner than the base of the wedge section of the washer and being formed as a continuation of the valve contacting face of the washer, and segmental flat cheek extensions of the cylinder wall being formed in each of said portways in register with said cheeks of said washers and providing bearing surfaces therefor, the spring force exerted by each washer tending to increase the diameter of said washer and the arrangement of the mutually engaged inclined faces being such that by their co-operation in conjunction with the spring force of the washer, said washer is urged to maintain surface contact with the respective opposite sides of said valve, whereby said slide valve is floatingly reciprocated between said spring washers on its respective sides.

2. A four-stroke internal combustion engine comprising a cylinder, a piston adapted to reciprocate therein, valve portways opening into the wall of the cylinder, sliding valves operating in passages provided in the cylinder walls, said valves being individual to the portways and each being arranged to pass across the associated portway, each of said portways being provided with a pair of recesses provided on the respective sides of the associated valve, each of said recesses having an inclined base, a pair of springy and transversely split sealing washers adapted to fit into the respective recesses, and each of said washers having an inclined face adapted to bed on the inclined base of the associated recess, each of said sealing washers being provided with a pair of opposite segmental flat cheeks thinner than the base of the wedge section of the washer and being formed as a continuation of the valve contacting face of the washer and being provided with engaging locking means, and segmental flat extensions of the cylinder wall being formed in each of said portways in register with said cheeks of said washers and providing bearing surfaces therefor and being further provided with engageable locking means adapted to engage and lock said engaging locking means on said washer cheek, the spring force exerted by each washer tending to increase the diameter of said washer and the arrangement of the mutually engaged inclined faces being such that by their co-operation in conjunction with the spring force of the washer, said washer is urged to maintain surface contact with the respective opposite sides of said valve, whereby said slide valve is floatingly reciprocated between said spring washers on its respective sides.

WILLIAM CHARLES TOMKINS.